R. L. RAMEY.
COFFEE POT.
APPLICATION FILED APR. 1, 1910.
972,915.
Patented Oct. 18, 1910.
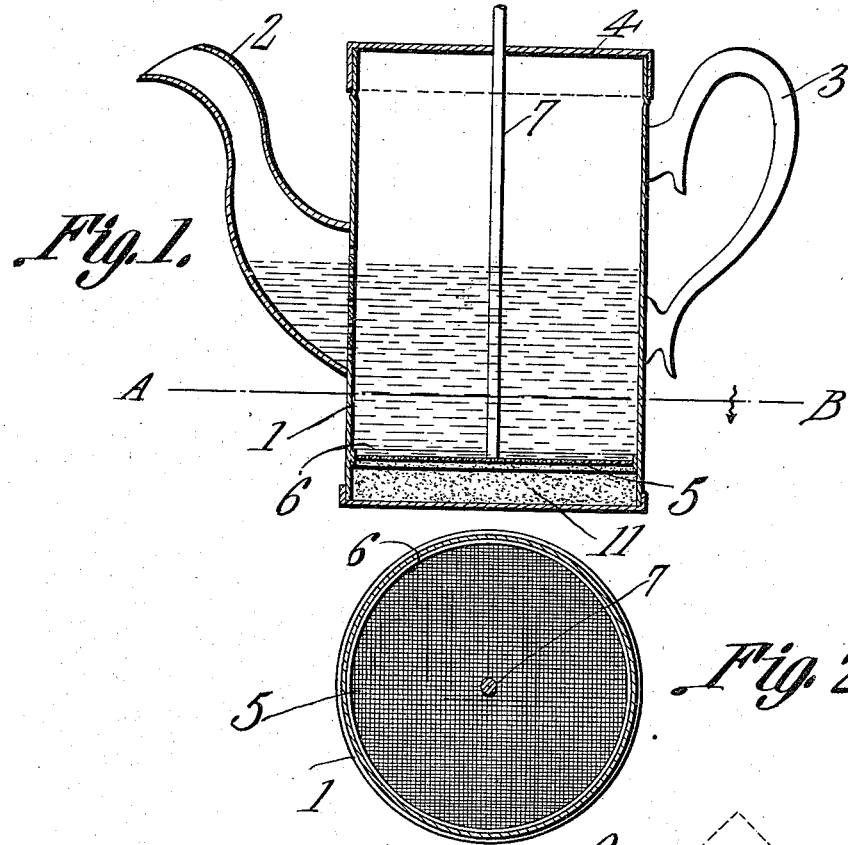
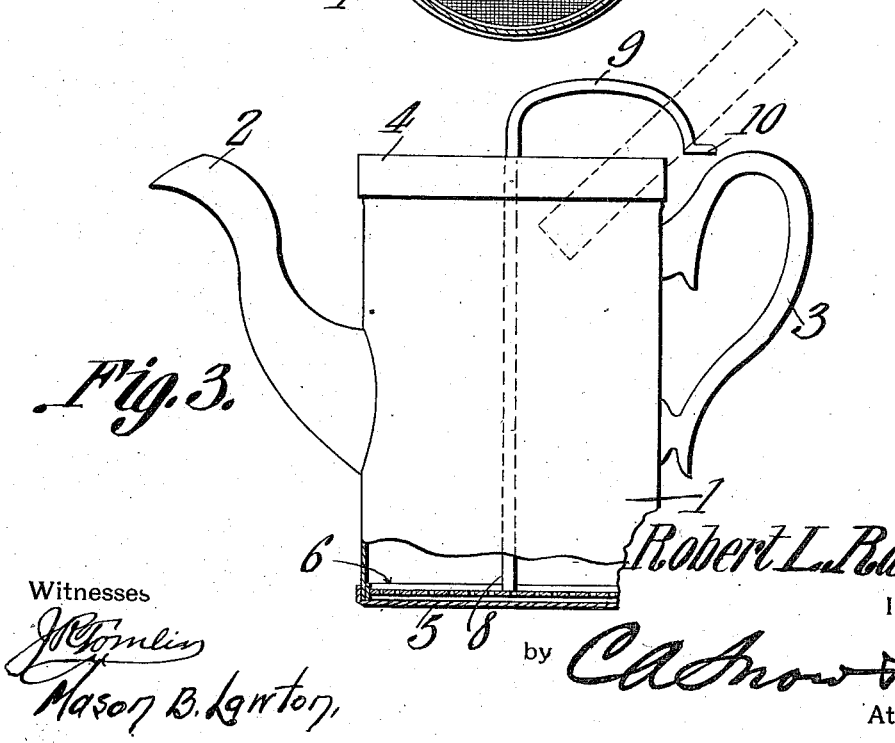
Witnesses
J. R. Tomlin
Mason B. Lawton
Robert L. Ramey,
Inventor
by C. A. Snow & Co.
Attorneys

UNITED STATES PATENT OFFICE.

ROBERT LEE RAMEY, OF DANVILLE, VIRGINIA.

COFFEE-POT.

972,915.      Specification of Letters Patent.      Patented Oct. 18, 1910.

Application filed April 1, 1910. Serial No. 552,773.

*To all whom it may concern:*

Be it known that I, ROBERT L. RAMEY, a citizen of the United States, residing at Danville, in the county of Pittsylvania and State of Virginia, have invented a new and useful Coffee-Pot, of which the following is a specification.

It is the object of this invention to provide a pot, adapted for brewing coffee and the like, the construction being such that the tea or coffee grounds may readily be retained in place within the pot, while the beverage is being poured therefrom.

Another object of the invention is to provide a pot having a reciprocating member therein, adapted, in its reciprocation, to agitate the contents of the pot.

Another object of the invention is to provide a pot having a reciprocating member therein, the reciprocating member being so constructed that it may be engaged simultaneously with the handle of the pot, the reciprocating member constituting at the same time, a rest upon which the cover of the pot may be disposed.

With the above and other objects in view, the invention consists in the novel construction and arrangement of parts hereinafter described, delineated in the accompanying drawings, and specifically claimed, it being understood, that, within the scope of what is claimed, divers changes in the form, proportions, size, and minor details of the structure may be made, without departing from the spirit of the invention, or sacrificing any of the advantages thereof.

Similar numerals of reference are employed to denote corresponding parts throughout the several figures of the drawings.

In the accompanying drawings,—Figure 1 shows the invention in vertical longitudinal section, parts being in elevation; Fig. 2 is a transverse section upon the line A—B of Fig. 1; and Fig. 3 is a side elevation of a modification of the invention, parts being broken away better to illustrate the structure.

The invention includes, as a primary and fundamental element, a pot 1, preferably cylindrical in cross section. This pot 1 has the usual spout 2, and carries a handle 3, upwardly extended, into the vicinity of the upper edge of the pot. A flanged cover 4 fits about the upper edge of the pot.

Slidably mounted within the pot 1, is a perforated or foraminous head 5. This head 5 is of substantially the same diameter as the pot 1. About the periphery of the head 5, is a flange 6, upstanding above and extending below the plane of the head 5. This flange 6 fits closely, yet slidably within the pot 1, so that, as the head 5 slides from one end of the pot to the other, the head may not tilt out of rectangular relation with respect to the axis of the pot; a contingency resulting in the head 5 being wedged against movement in the pot.

Fixed to and rising from the head 5, is a plunger 7. This plunger 7 is extended through and above the cover 4 of the pot, and is slidably mounted therein.

In practical operation, the tea, coffee or the like, denoted by the numeral 11, is placed within the pot. The head 5 and the plunger 7 which is connected therewith, are mounted in place within the pot 1 above the material which is in the pot. The tea or coffee is then brewed in the usual manner, and during the brewing operation, the upper end of the plunger 7 which extends above the cover 4, may be grasped, the head 5 being reciprocated within the pot 1, thus thoroughly agitating the contents of the pot and obtaining a brew of maximum strength.

When the brew is to be poured from the pot, by pressing downwardly upon the plunger 7, the head 5 may be held in close contact with the material 11, thus compressing the same in the bottom of the pot, and preventing any particles of the material from finding their way outward with the liquid, through the spout 2.

Sometimes, as shown in Fig. 3, the plunger 8 is curved, as shown at 9, at its upper end, so that the protruding extremity of the plunger is disposed in close relation with respect to the handle 3; and at the end of the curved portion 9 there is fashioned an outstanding extension 10, the same constituting a thumb-piece. Thus, while the hand of the operator is grasped about the handle 3, the thumb or one of the fingers of the operator's hand may be pressed upon the thumb-piece 10, thus holding the head 5 down securely upon the contents of the pot, while the liquid is being poured therefrom. Thus, the other hand of the operator is left entirely free for the manipulation of the tea or coffee cup into which the brew is being poured. In connection with Fig. 3 it may be noted, moreover, that, when it is desired to open the pot, the cover 4 may be slid upwardly and laterally along the curved portion 9 of the plunger, the cover ultimately resting, within the contour of the pot 1, against the thumb-piece 10. Thus, the thumb-piece 10 serves, not only as a means for holding the head 5 down in the pot, but, as well, as a means for holding the cover 4 in place when the same is tilted into the open position shown in Fig. 3 of the drawing.

In either form of the invention, the head 5 may be readily removed from the pot 1 without disturbing the contents 11 of the pot. Thus, if desired, additions of tea or coffee may be made to the contents 11 of the pot, without disturbing the material which is already in place.

Having thus described the invention, what is claimed is:—

1. In a device of the class described, a pot having a handle; a head slidable in the pot; and a plunger secured at its lower end to the head, the upper end of the plunger being curved into close proximity to the handle, whereby one hand of the operator may be employed to engage both the handle and the plunger.

2. In a device of the class described, a pot having a handle; a cover for the pot; a head slidable in the pot; a plunger secured at one end to the head, the plunger being extended through and above the cover and slidably mounted therein; the plunger being curved into close proximity to the handle and being provided with a thumb piece adapted for manual engagement simultaneously with the handle; the cover being slidable upon the curved portion of the plunger to rest against the thumb-piece.

In testimony that I claim the foregoing as my own, I have hereto affixed my signature in the presence of two witnesses.

ROBERT LEE RAMEY.

Witnesses:
R. H. BASS,
C. B. GUERRANT.